US011938734B2

(12) United States Patent
Takahashi et al.

(10) Patent No.: US 11,938,734 B2
(45) Date of Patent: Mar. 26, 2024

(54) CLEANING SOLUTION AND INKJET PRINTER CLEANING METHOD

(71) Applicant: Nippon Kayaku Kabushiki Kaisha, Tokyo (JP)

(72) Inventors: Hirotoshi Takahashi, Tokyo (JP); Ha Sai, Tokyo (JP); Toru Ishii, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 322 days.

(21) Appl. No.: 17/310,510

(22) PCT Filed: Feb. 4, 2020

(86) PCT No.: PCT/JP2020/004130

§ 371 (c)(1),
(2) Date: Aug. 6, 2021

(87) PCT Pub. No.: WO2020/175033

PCT Pub. Date: Sep. 3, 2020

(65) Prior Publication Data

US 2022/0097376 A1 Mar. 31, 2022

(30) Foreign Application Priority Data

Feb. 26, 2019 (JP) ................................ 2019-032212
Jul. 8, 2019 (JP) ................................ 2019-126603

(51) Int. Cl.

| | |
|---|---|
| ***B41J 2/165*** | (2006.01) |
| ***B41J 2/21*** | (2006.01) |
| ***C11D 1/72*** | (2006.01) |
| ***C11D 1/722*** | (2006.01) |
| ***C11D 3/20*** | (2006.01) |
| ***C11D 3/43*** | (2006.01) |
| ***C11D 11/00*** | (2006.01) |

(52) U.S. Cl.

CPC .......... *B41J 2/165* (2013.01); *B41J 2/16552* (2013.01); *C11D 1/72* (2013.01); *C11D 1/722* (2013.01); *C11D 3/2068* (2013.01); *C11D 3/43* (2013.01); *C11D 11/0047* (2013.01); *B41J 2/2114* (2013.01)

(58) Field of Classification Search

CPC . B41J 2/165; B41J 2/16552; B41J 2/01; B41J 2/2107; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; C11D 1/72; C11D 1/722; C11D 3/2068; C11D 3/43; C11D 11/0047; B41M 5/5209; B41M 5/52; B41M 5/5218; B41M 5/5227; B41M 5/5254; B41M 5/0047; B41M 5/025; B41M 7/009; B41M 5/0023; B41M 5/0041; B41M 5/0011; B41M 5/0017; B41M 7/00; B41M 7/0072; B32B 27/00; C09D 5/00; C09D 11/101; C09D 11/30; C09D 11/36; C09D 11/54; C09D 11/102; C09D 11/106; C09D 11/107; C09D 11/328; C09D 11/40; C09D 11/103; C09D 11/326; C09D 11/38; C09D 11/32; C09D 11/322; C09D 11/324; C09D 11/005; C09D 11/52; D06P 1/0096; D06P 1/16; D06P 1/908; D06P 1/928; D06P 5/30; D06P 2001/906; D06P 1/5221; D06P 1/5257; D06P 1/5285; D06P 1/56; D06P 5/004; D06P 5/006; D06P 5/003

See application file for complete search history.

(56) References Cited

U.S. PATENT DOCUMENTS 4,968,596 A * 11/1990 Inoue ................ G03C 1/48546 430/552
5,825,380 A * 10/1998 Ichizawa ............ B41J 2/16552 347/30
2002/0008725 A1* 1/2002 Katsuragi ........... B41J 2/16552 347/28
2005/0018023 A1 1/2005 Momose et al.
2010/0062962 A1* 3/2010 Momose ............. B41J 2/16552 510/170
2010/0300044 A1 12/2010 Man et al.
2011/0069114 A1* 3/2011 Ikoshi ................. B41J 2/16552 106/31.13
2014/0107007 A1* 4/2014 Sao ....................... C09D 11/40 510/170
2015/0077465 A1* 3/2015 Haijima .............. B41J 2/16552 524/106

(Continued)

FOREIGN PATENT DOCUMENTS

EP 0343503 A1 11/1989
JP 2002-105500 A 4/2002
JP 2005-146224 A 6/2005
JP 4397220 B2 10/2009

(Continued)

*Primary Examiner* — Manish S Shah

(74) *Attorney, Agent, or Firm* — KNOBBE, MARTENS, OLSON & BEAR LLP

(57) ABSTRACT

A cleaning solution containing a compound represented by formula (1), a compound represented by formula (2), and water; and an inkjet printer cleaning method using the same.

$$R^1—O(EO)_m(PO)_nH \quad (1)$$

$$R^2—O(EO)_LH \quad (2)$$

In formula (1), $R^1$ represents a linear or branched C1-C30 alkyl group. EO represents an ethyleneoxy group, and PO represents a propyleneoxy group. m and n each independently represent an integer of 1-5. m:n, which is the ratio between m and n, is at least 1:2 and smaller than 3:2. In formula (2), $R^2$ represents a linear or branched C1-C30 alkyl group, or an aryl group. EO represents an ethyleneoxy group. L represents an integer of at least 10. Formula (1): $R^1—O(EO)_m(PO)_nH$. Formula (2): $R^2—O(EO)_LH$.

8 Claims, No Drawings

(56) References Cited

U.S. PATENT DOCUMENTS

| | | | | |
|---|---|---|---|---|
| 2017/0158899 | A1* | 6/2017 | Willems | B41J 2/01 |
| 2017/0183528 | A1* | 6/2017 | Kohzuki | C09D 11/322 |

FOREIGN PATENT DOCUMENTS

| | | | |
|---|---|---|---|
| JP | 5027444 | B2 | 6/2012 |
| JP | 2012-528047 | A | 11/2012 |
| JP | 4649823 | B2 | 12/2012 |
| JP | 2013-146952 | A | 8/2013 |
| JP | 5618250 | B2 | 9/2014 |
| JP | 5819205 | B2 | 10/2015 |
| JP | 5819206 | B2 | 10/2015 |
| JP | 2018-094851 | A | 6/2018 |
| WO | WO 91/09925 | A2 | 7/1991 |

* cited by examiner

CLEANING SOLUTION AND INKJET PRINTER CLEANING METHOD

This application is the U.S. National Phase under 35 U.S.C. § 371 of International Application PCT/JP2020/004130, filed Feb. 4, 2020, designating the U.S., and published in Japanese as WO 2020/175033 on Sep. 3, 2020, which claims priority to Japanese Patent Application No. 2019-032212, filed Feb. 26, 2019; and Japanese Patent Application No. 2019-126603, filed Jul. 8, 2019, the entire contents of which are incorporated herein by reference.

TECHNICAL FIELD

The present invention relates to a cleaning solution, in particular a cleaning solution used for cleaning an ink-jet printer, and also relates to a method of cleaning an ink-jet printer using the above cleaning solution.

BACKGROUND ART

A method of printing using an ink-jet printer (the ink-jet printing method) is a method involving generating a droplet of an ink, and allowing the droplet to adhere on a recording medium such as paper, thereby performing printing.

In recent years, advances have been made in the ink-jet printing method to increase industrial applications thereof. Coloring matters contained in ink-jet inks are broadly classified into water-soluble coloring matters and water-insoluble coloring matters. Among these, water-insoluble coloring matters, such as pigments, generally have superior robustness in various properties as compared with water-soluble coloring matters. For this reason, many industrial ink-jet inks include a water-insoluble coloring matter.

Recording media for use in industrial applications are diversified into various types of paper, fibers, films, and the like, and there are many recording media which are ink-non-absorbent type, such as a resin film, etc. or ink absorption resistant-type, such as coated paper, etc. As inks used for printing on such an ink-non-absorbent or ink absorption-resistant recording media, known are non-aqueous solvent inks, curable inks, and the like. However, an aqueous ink that is replaceable with these is strongly demanded in view of safety for natural environment, living bodies, and the like. Such an aqueous ink may include a water-insoluble coloring matter and a dispersing agent, and in general may further include a polymer, wax, and others in order to improve rub fastness, solvent resistance, and the like. Consequently, such an aqueous ink may have a large content of solid matter, and thus tend to be dried very easily. A dried ink often forms solid matter in a nozzle portion of an ink-jet head and/or an ink flow path, resulting in clogging when stored for a long time, stored under high-temperature or low-humidity environments, and the like. If clogging occurs within an ink-jet head as described above, an ink cannot be stably discharged, resulting in a problem of reduced image density, etc. Accordingly, improvements are commonly made in industrial ink-jet heads. For example, a nozzle portion may include a cap member to prevent a dried ink. However, it is difficult to completely avoid a dried ink when environments in which the ink-jet printer runs are harsh.

In view of the above situations, there exist strong demands for a cleaning solution (may also be referred to as a washing liquid, a maintenance liquid, and the like) capable of dissolving and removing solid matter even if the solid matter is formed when an ink is dried, and clogs an ink-jet head. Patent Documents 1 to 6 disclose cleaning solutions used for cleaning ink-jet printers.

Patent Document 1: Japanese Patent No. 5027444
Patent Document 2: Japanese Patent No. 4649823
Patent Document 3: Japanese Patent No. 4397220
Patent Document 4: Japanese Patent No. 5618250
Patent Document 5: Japanese Patent No. 5819206
Patent Document 6: Japanese Patent No. 5819205

DISCLOSURE OF THE INVENTION

Problems to be Solved by the Invention

An object of the present invention is to provide a cleaning solution capable of dissolving and removing solid matter even if the solid matter is formed when a coloring ink is dried. Another object of the present invention is to provide a method of cleaning an ink-jet printer using the above cleaning solution.

Means for Solving the Problems

Specific means for achieving the above objects include the following embodiments.

A first aspect of the present invention relates to a cleaning solution containing a compound represented by the following formula (1):

$$R^1—O(EO)_m(PO)_nH \quad (1)$$

in which $R^1$ represents a linear or branched C1 to C30 alkyl group, EO represents an ethyleneoxy group and PO represents a propyleneoxy group, an order in which EO and PO are bonded to each other is any order, m and n each independently represents an integer of 1 to 5, and a ratio of m and n, m:n, is 1:2 or more and less than 3:2, a compound represented by the following formula (2):

$$R^2—O(EO)_LH \quad (2)$$

in which $R^2$ represents a linear or branched C1 to C30 alkyl group or an aryl group, EO represents an ethyleneoxy group, and L represents an integer of 10 or more, and water.

A second aspect of the present invention relates to the cleaning solution as described in the first aspect, in which a content of the compound represented by the formula (2) is 0.2% by mass to 2% by mass.

A third aspect of the present invention relates to the cleaning solution as described in the first or second aspect, further containing an organic solvent.

A fourth aspect of the present invention relates to the cleaning solution as described in the third aspect, in which the organic solvent is a glycol ether.

A fifth aspect of the present invention relates to use of the cleaning solution as described in any one of the first to fourth aspects, for cleaning an ink-jet printer.

A sixth aspect of the present invention relates to a method of cleaning an ink-jet printer, the method including contacting solid matter of ink-jet ink adhering to the ink-jet printer with the cleaning solution as described in any one of the first to fourth aspects, thereby dissolving and removing the solid matter.

A seventh aspect of the present invention relates to the method of cleaning as described in the sixth aspect, the method including:

filling an ink-jet head with the cleaning solution, and passing the cleaning solution through an ink flow path, thereby dissolving and removing the solid matter adhering to the ink flow path.

An eighth aspect of the present invention relates to the method of cleaning as described in the sixth aspect, the method including:

immersing a nozzle of the ink-jet head in the cleaning solution, thereby dissolving and removing the solid matter adhering to the nozzle.

Effects of the Invention

The present invention can provide a cleaning solution capable of dissolving and removing solid matter even if the solid matter is formed when a coloring ink is dried, and also can provide a method of cleaning an ink-jet printer using the above cleaning solution.

PREFERRED MODE FOR CARRYING OUT THE INVENTION

The terms "%" and "part" as used herein are both based on mass unless otherwise specifically noted.

<Cleaning Solution>

The cleaning solution according to the present embodiment contains a compound represented by the above formula (1), a compound represented by the above formula (2), and water. By using the compounds each represented by the above formula (1) or (2) in combination, a cleaning solution which is a uniform solution can be obtained. Further, by making the cleaning solution a uniform solution, it is possible to stably exhibit high cleaning ability.

Hereinafter, components contained in the cleaning solution according to the present embodiment will be described in detail. Note that of the respective components described below, one of them may be used alone, and two or more of them may be used in combination.

[Compound Represented by Formula (1)]

In the above formula (1), $R^1$ represents a linear or branched C1 to C30 alkyl group, and a C10 to C18 alkyl group is preferred, and a C12 to C15 alkyl group is more preferred. Among these, a linear alkyl group is preferred.

In the above formula (1), EO represents an ethyleneoxy group and PO represents a propyleneoxy group. The order in which EO and PO are bonded to each other may be any order and is not limited to the order shown in the above formula (1), but the order shown in the above formula (1) is preferred.

In the above formula (1), m and n each independently represents an integer of 1 to 5. The ratio of m:n is in the range of 1:2 or more and less than 3:2. As the combination (m:n) of m and n, 1:2, 2:3, 3:4, 4:5, 5:5, 4:4, 3:3, 2:2, 1:1, 5:4, and 4:3 are preferred, and 4:4 is more preferred.

Note that m and n are both average values. For this reason, in this specification, when m and n have values after the decimal points, values obtained by rounding the first decimal places to integers are defined as the values of m and n.

The compound represented by the above formula (1) can be synthesized by a known method. It can be also obtained as a commercial product. Specific commercial products include, for example, GENAPOL EP2424 and EP2544 manufactured by Clariant AG.

The total content of the compound represented by the above formula (1) in the total mass of the cleaning solution is preferably 0.1% to 2%, and more preferably 0.5% to 1%.

[Compound Represented by Formula (2)]

In the above formula (2), $R^2$ represents a linear or branched C1 to C30 alkyl group or an aryl group.

As the alkyl group in $R^2$, a C10 to C28 alkyl group is preferred, a C10 to C26 alkyl group is more preferred, a C10 to C24 alkyl group is more preferred, a C12 to C24 alkyl group is more preferred, and a C13 to C22 alkyl group is most preferred. Among these, a linear alkyl group is preferred.

As the aryl group in $R^2$, a C6 to C14 aryl group is preferred, a C6 to C10 aryl group is more preferred, and a phenyl group is most preferred.

The aryl group in $R^2$ may further have a substituent. The number of substituents is usually 1 to 5, preferably 1 to 4, more preferably 1 to 3, more preferably 1 or 2, and most preferably 2. Examples of the substituent include an arylalkyl group. Among the arylalkyl group, a C6 to C14 aryl C1 to C6 alkyl group is preferred, a C6 to C10 aryl C1 to C4 alkyl group is more preferred, a C6 to C10 aryl C1 to C3 alkyl group is more preferred, a C6 to C10 aryl C1 to C2 alkyl group is more preferred, and a phenethyl group (phenylethyl group) is most preferred.

In the above formula (2), EO represents an ethyleneoxy group. In the above formula (2), L represents an integer of 10 or more, preferably an integer of 10 to 30, more preferably an integer of 10 to 26, more preferably an integer of 10 to 22, more preferably an integer of 10 to 20, and most preferably an integer of 13 to 18.

Note that L is an average value. For this reason, in this specification, when L has a value after the decimal point, a value obtained by rounding up the first decimal place to an integer is defined as the value of L.

The compound represented by the above formula (2) can be synthesized by a known method. It is also available as a commercial product. Specific examples of commercially available products include GENAPOL X150 manufactured by Clariant AG, Emulgen A90 manufactured by Kao Corporation, and the like.

The total content of the compound represented by the above formula (2) in the total mass of the cleaning solution is usually 0.2% to 2%, and preferably 0.5% to 2%.

[Water]

The cleaning solution according to the present embodiment includes water as a solvent. For water, ion-exchanged water, distilled water, or the like is preferably used for the purpose of reducing ionic impurities to as low as possible.

The content of water in the total mass of a cleaning solution is usually 60% to 80%, and preferably 65% to 80%.

[Organic Solvent]

The cleaning solution of the present embodiment may further include an organic solvent. Organic solvents include, for example, C1 to C6 alkanols each having one hydroxy group such as methanol, ethanol, propanol, isopropanol, butanol, isobutanol, secondary butanol, and tertiary butanol; amides such as N,N-dimethylformamide and N,N-dimethylacetamide; lactams such as 2-pyrrolidone, N-methyl-2-pyrrolidone, and N-methylpyrrolidin-2-one; cyclic urea such as 1,3-dimethylimidazolidin-2-one and 1,3-dimethylhexahydropyrimid-2-one; ketones or keto-alcohols such as acetone, 2-methyl-2-hydroxypentan-4-one, and ethylene carbonate; cyclic ethers such as tetrahydrofuran and dioxane; mono-, oligo-, or poly-alkylene glycols or thioglycols each having a C2 to C8 alkylene unit such as ethylene glycol, diethylene glycol, 1,2-propylene glycol, 1,3-propylene glycol, 1,4-butylene glycol, 1,6-hexylene glycol, 1,2-hexanediol, 1,2-pentanediol, 4-methyl-1,2-pentanediol, 3,3-dimethyl-1,2-butanediol, 1,2-octanediol, 5-methyl-1,2-hexanediol, 4-methyl-1,2-hexanediol, 4,4-dimethyl-1,2-pentanediol, diethylene glycol, triethylene glycol, tetraethylene glycol, dipropylene glycol, polyethylene glycol or polypropylene glycol having a molecular weight of 400 or more, thiodiglycol, or dithiodiglycol; polyols (triols)

such as glycerin, diglycerin, hexane-1,2,6-triol, and trimethylolpropane; γ-butyrolactone, dimethyl sulfoxide; glycol ethers, and the like. Among these, the glycol ethers are preferred.

For glycol ether, preferred is a monoalkyl ether of di or tri C2 to C4 alkylene glycol. Examples of the C2 to C4 alkylene glycol moiety include ethylene glycol, propylene glycol, and butylene glycol. Among these, ethylene glycol and propylene glycol are preferred, and ethylene glycol is more preferred. The range of carbon number of the alkyl in the monoalkyl ether moiety is usually C1 to C6, preferably C1 to C5, more preferably C2 to C4, more preferably C3 to C4, and most preferably C4.

Specific examples of glycol ethers include, for example, ethylene glycol monomethyl ether, ethylene glycol monoethyl ether, diethylene glycol monoethyl ether, diethylene glycol monopropyl ether, diethylene glycol monobutyl ether (butyl diglycol), triethylene glycol monomethyl ether, triethylene glycol monoethyl ether, ethylene glycol monoallyl ether, ethylene glycol monoisopropyl ether, diethylene glycol monomethyl ether, propylene glycol monopropyl ether, triethylene glycol monobutyl ether, and the like. Among these, butyl diglycol is preferred.

A total content of the organic solvents in the total mass of the cleaning solution is usually 0% to 60%, preferably 0.1% to 50%, more preferably 0.2% to 40%, and most preferably 0.5% to 30%. In addition, when at least a glycol ether is contained as the organic solvent, a total content of the glycol ether is usually 0 to 15%, preferably 0.1 to 15%, more preferably 0.2 to 13%, and most preferably 0.5 to 10%.

When a glycol ether and other organic solvents are used in combination, a sum of each of contents of them is a total content of the organic solvents in the total mass of the cleaning solution. At this time, the total content of glycol ethers is also as described above.

[Preparation Agent]

In addition to the above-described components, the cleaning solution according to the present embodiment may further contain various preparation agents if necessary. Examples of such preparation agents include a surfactant (except for the compound represented by the above formula (1) and the compound represented by the above formula (2)), an antiseptic agent, an antifungal agent, a pH adjusting agent, a chelating reagent, a rust-preventive agent, a water-soluble ultraviolet absorbing agent, an antioxidant, and the like.

The total content of the preparation agents in the total mass of the cleaning solution is usually about 0% to 30%, preferably about 0% to 20%, and more preferably about 0% to 10%.

The cleaning solution according to the present embodiment does not substantially contain a colorant. By "substantially" herein is meant that no colorant is intentionally added into the cleaning solution.

The surfactant includes anionic, cationic, nonionic, amphoteric, silicon-based, and fluorine-based surfactants. Among these, nonionic surfactants are preferred.

The anionic surfactant includes, for example, alkylsulfocarboxylate salts, α-olefin sulfonate salts, polyoxyethylene alkyl ether acetate salts, polyoxyethylene alkyl ether sulfate salts, N-acylamino acid or salts thereof, N-acylmethyltaurine salts, alkylsulfate polyoxyalkyl ether sulfate salts, alkylsulfate salt polyoxyethylene alkyl ether phosphate salts, rosin acid soap, castor oil sulfate ester salts, lauryl alcohol sulfate ester salts, alkylphenol-type phosphate esters, alkyl-type phosphate esters, alkylarylsulfonate salts, diethyl sulfosuccinate salts, diethylhexyl sulfosuccinate salts, dioctyl sulfosuccinate salts, and the like.

The cationic surfactant includes, for example, 2-vinylpyridine derivatives, poly(4-vinylpyridine) derivatives, and the like.

The nonionic surfactant includes, for example, those based on ether such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ether, and polyoxyethylene distyrenated phenyl ether; those based on ester such as polyoxyethylene oleate ester, polyoxyethylene distearate ester, sorbitan laurate, sorbitan monostearate, sorbitan monooleate, sorbitan sesquioleate, polyoxyethylene monooleate, and polyoxyethylene stearate; those based on acetyleneglycols (alcohols) such as 2,4,7,9-tetramethyl-5-decyne-4,7-diol, 3,6-dimethyl-4-octyne-3,6-diol, and 3,5-dimethyl-1-hexyn-3-ol; and the like.

The amphoteric surfactant includes, for example, lauryldimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, imidazoline derivatives and the like.

The silicone-based surfactant includes, for example, polyether modified siloxane, polyether modified polydimethylsiloxane, and the like.

The fluorine-based surfactant includes, for example, perfluoroalkylsulfonic acid compounds, perfluoroalkylcarboxylic acid-based compounds, perfluoroalkylphosphate compounds, perfluoroalkylethylene oxide adducts, and polyoxyalkylene ether polymer compounds each having a perfluoroalkylether group in a side chain, and the like.

The antiseptic agent includes, for example, organic sulfur-based, organic nitrogen sulfur-based, organic halogen-based, haloarylsulfone-based, iodopropargyl-based, haloalkylthio-based, nitrile-based, pyridine-based, 8-oxyquinoline-based, benzothiazole-based, isothiazoline-based, dithiol-based, pyridinoxide-based, nitropropane-based, organic tin-based, phenol-based, quaternary ammonium salt-based, triazine-based, thiazine-based, anilide-based, adamantane-based, dithiocarbamate-based, brominated indanon-based, benzyl bromoacetate-based, inorganic salt-based compounds, and the like.

The antifungal agent includes, for example, sodium dehydroacetate, sodium benzoate, sodium pyridinethione-1-oxide, p-hydroxybenzoic acid ethyl ester, and 1,2-benzisothiazolin-3-one and salts thereof, and the like.

Any substance may be used as the pH adjusting agent as long as the pH of a cleaning solution to be prepared can be adjusted to 5 to 11 without causing adverse effects on the cleaning solution. Specific examples thereof include, for example, alkanolamines such as diethanolamine, triethanolamine, and N-methyldiethanolamine; hydroxides of alkali metals such as lithium hydroxide, sodium hydroxide, and potassium hydroxide; ammonium hydroxide (aqueous ammonia); carbonates of alkali metals such as lithium carbonate, sodium carbonate, sodium hydrogen carbonate, and potassium carbonate; alkali-metal salts of organic acids such as sodium silicate and potassium acetate; inorganic bases such as disodium phosphate; and the like.

The chelating reagent includes, for example, disodium ethylenediaminetetraacetate, sodium nitrilotriacetate, sodium hydroxyethylethylenediaminetriacetate, sodium diethylenetriaminepentaacetate, sodium uracildiacetate and the like.

The rust-preventive agent includes, for example, hydrogen sulfite salts, sodium thiosulfate, ammonium thioglycolate, diisopropylammonium nitrite, pentaerythritol tetranitrate, dicyclohexylammonium nitrite, and the like.

The water-soluble ultraviolet absorbing agent includes, for example, sulfonated benzophenone-based compounds, benzotriazole-based compounds, salicylic acid-based compounds, cinnamic acid-based compounds, triazine-based compounds, and the like.

As the antioxidant, for example, various organic-based and metal complex-based anti-fading agents can be used. The organic anti-fading agents include, for example, hydroquinones, alkoxyphenols, dialkoxyphenols, phenols, anilines, amines, indans, chromans, alkoxyanilines, heterocycles, and the like.

[Method of Preparing Cleaning Solution, Etc.]

The cleaning solution according to the present embodiment can be obtained by adding the compound represented by the above formula (1), the compound represented by the above formula (2), water, and, if required, an organic solvent and/or a preparation agent, and performing thorough mixing. The resulting cleaning solution may be subjected to precision filtration in order to remove contaminants. In particular, the cleaning solution is preferably subjected to precision filtration when it is used to fill an ink-jet head. For precision filtration, a membrane filter, a glass filter paper, and the like can be used. The pore size of a filter and the like for performing precision filtration is usually 0.5 μm to 20 μm, preferably 0.5 μm to 10 μm.

The pH of the cleaning solution according to the present embodiment at 25° C. is usually pH 5 to 11, preferably pH 7 to 10.5 in order to prevent members of an ink-jet printer from undergoing corrosion. The surface tension of the cleaning solution according to the present embodiment at 25° C. is usually 10 mN/m to 50 mN/m, and preferably 20 mN/m to 40 mN/m. The viscosity of the cleaning solution according to the present embodiment at 25° C. is usually 30 mPa·s or less, preferably 20 mPa·s or less, and the lower limit is around 0.1 mPa·s.

[Applications of Cleaning Solution]

The cleaning solution according to the present embodiment can be used for dissolving and removing solid matter resulting from solidification of an aqueous ink including various coloring agents. Aqueous inks include aqueous inks containing water-soluble dyes such as acid dyes, direct dyes, and reactive dyes; aqueous inks containing water-insoluble coloring matters such as disperse dyes and pigments; and the like. The cleaning solution according to the present embodiment is preferably used to dissolve and remove solid matter resulting from solidification of an aqueous ink containing a water-insoluble coloring matter, in particular a pigment in view of the high cleaning capability of the cleaning solution according to the present embodiment. In addition, the cleaning solution according to the present embodiment has a high cleaning performance and exhibits an extremely high ability as a cleaning solution to dissolve and remove solid matter resulting from solidification of an aqueous ink containing various resins together with a pigment.

<Method of Cleaning Ink-Jet Printer>

The method of cleaning an ink-jet printer according to the present embodiment involves contacting the aforementioned cleaning solution according to the present embodiment with solid matter of an ink-jet ink adhering on the ink-jet printer, thereby dissolving and removing the solid matter.

Ink-jet inks include aqueous inks containing water-soluble dyes such as acid dyes, direct dyes, and reactive dyes; aqueous inks containing water-insoluble coloring matters such as disperse dyes and pigments; and the like. Especially, the cleaning solution according to the present embodiment is capable of dissolving and removing solid matter resulting from solidification of an aqueous ink containing a water-insoluble coloring matter, in particular a pigment by virtue of the high cleaning capability of the cleaning solution according to the present embodiment.

There is no particular limitation for the method of contacting the cleaning solution according to the present embodiment with solid matter of an ink-jet ink. For example, a cleaning solution may be absorbed by sponge, cloth, and the like, and contaminants in a portion on which solid matter of a coloring ink adheres may be wiped off. Alternatively, an ink-jet head may be filled with a cleaning solution in place of a coloring ink to pass the cleaning solution through an ink flow path when the coloring ink is dried on the ink-jet head, resulting in serious contamination of the ink-jet head. The cleaning solution passed through as described above can dissolve and remove solid matter of a coloring ink adhering within an ink-jet head, within an ink flow path, on a nozzle, and the like. Alternatively, when the nozzle of the ink-jet head is clogged by the solid matter of the coloring ink, the nozzle may be immersed in the cleaning solution. By immersing in the cleaning solution in this manner, it is possible to dissolve and remove the solid matter of the coloring ink adhering to the nozzle.

With regard to all of the aforementioned items, combinations of those preferred are more preferred, and combinations of those more preferred are most preferred. The same applies to combinations of those preferred and those more preferred, combinations of those more preferred and those most preferred, and the like.

EXAMPLES

Below, the present invention will be described more specifically with reference to Examples, but the present invention shall not be limited to the following Examples. Unless otherwise specifically noted, preparation of cleaning solutions and coloring inks were all performed under stirring. Further, the term "water" used in Examples refers to ion-exchanged water.

Examples 1 to 3: Preparation of Cleaning Solutions

The components shown in Table 1 below were mixed accordingly to obtain solutions each having a total amount of 100 parts. The resulting solutions were each filtered through a membrane filter with a pore size of 3 μm to obtain cleaning solutions of Examples 1 to 3.

Comparative Examples 1 to 5: Preparation of Comparative Cleaning Solutions

Comparative cleaning solutions of Comparative Examples 1 to 5 were obtained as in Examples 1 to 3 except that the components shown in Table 1 below were used accordingly.

Abbreviations and the like used in Table 1 below have the following meanings. The numerical values in Table 1 are expressed in terms of "parts".

Gly: glycerin

2Py: 2-pyrrolidone

BDG: butyl diglycol

EP2424: Nonionic surfactant GENAPOL EP2424 manufactured by Clariant AG

EP2544: Nonionic surfactant GENAPOL EP2544 manufactured by Clariant AG

EP2564: Nonionic surfactant GENAPOL EP2564 manufactured by Clariant AG

EP2584: Nonionic surfactant GENAPOL EP2584 manufactured by Clariant AG

A90: Nonionic surfactant, Emulgen A90 manufactured by Kao Corporation

X150: Nonionic surfactant, GENAPOL X150 manufactured by Clariant AG

TDS30: Nonionic surfactant, Noigen TDS-30 manufactured by DKS Co., Ltd.

TEA: triethanolamine

GXL(S): Proxel GXL(S) manufactured by Lonza

Note that EP2424 is a compound represented by the above formula (1), wherein $R^1$ is a C12 to C14 alkyl group, m is 2, n is 4, and m:n is 1:2.

EP2544 is a compound represented by the above formula (1), wherein $R^1$ is a C12 to C15 alkyl group, m is 4, n is 4, and m:n is 1:1.

EP2564 is a compound which is represented by the above formula (1), wherein $R^1$ is a C12 to C15 alkyl group, m is 6, n is 4, and m:n is 3:2, and which is not contained in the above formula (1).

EP2584 is a compound which is represented by the above formula (1), wherein $R^1$ is a C12 to C15 alkyl group, m is 8, n is 4, and m:n is 2:1, and which is not contained in the above formula (1).

A90 is a compound represented by the above formula (2), wherein $R^2$ is a phenyl group substituted with two 1-phenylethyl groups, and L is 18.

X150 is a compound represented the above formula (2), wherein $R^2$ is a C13 alkyl group and L is 15.

TDS30 is a compound which is represented the above formula (2), wherein $R^2$ is a C13 alkyl group and L is 3, and which is not contained in the above formula (2).

TABLE 1

| | Example | | | Comparative Example | | | | |
|---|---|---|---|---|---|---|---|---|
| Component | 1 | 2 | 3 | 1 | 2 | 3 | 4 | 5 |
| Gly | 15 | 15 | 15 | 15 | 15 | 15 | 15 | 15 |
| 2Py | 2 | 2 | 2 | 2 | 2 | 2 | 2 | 2 |
| BDG | 7 | 7 | 7 | 7 | 7 | 7 | 7 | 7 |
| EP2424 | — | — | 0.5 | — | — | — | — | — |
| EP2544 | 0.5 | 0.5 | — | 0.5 | — | — | — | 0.5 |
| EP2564 | — | — | — | — | — | 0.5 | — | — |
| EP2584 | — | — | — | — | — | — | 0.5 | — |
| A90 | 0.5 | — | 0.5 | — | 0.5 | 0.5 | 0.5 | — |
| X150 | — | 0.25 | — | — | — | — | — | — |
| TDS30 | — | — | — | — | — | — | — | 2 |
| TEA | 0.3 | 0.3 | 0.3 | 0.3 | 0.3 | 0.3 | 0.3 | 0.2 |
| GXL(S) | 0.1 | 0.1 | 0.1 | 0.1 | 0.1 | 0.1 | 0.1 | 0.1 |
| Water | Balance | | | Balance | | | | |
| Total | 100 | | | 100 | | | | |

Preparation Example 1: Preparation of Resin A

Joncryl 678 (the mass average molecular weight: 8500) (25 parts) and triethanolamine (14.3 parts) were dissolved in ion-exchanged water (60.7 parts), and stirred for 1 hour to obtain a solution. The resulting solution is referred to as a "resin A".

Preparation Example 2: Preparation of Coloring Dispersion Liquid

A block copolymer described in Synthesis Example 3 of WO2013/115071 was prepared, and the resulting polymer dispersant (5 parts) was dissolved in 2-butanone (20 parts) to obtain a homogeneous solution. To this solution, added was a liquid in which sodium hydroxide (0.4 parts) was dissolved in water (50.6 parts). The resin A (4 parts) was then further added and stirred for 1 hour to obtain an emulsified liquid. To the above emulsified liquid, C. I. Pigment Yellow 74 (HANSA YELLOW 5GX 01-JP available from Clariant) (20 parts) was added, and dispersed in a sand grinder under a condition of 1500 rpm for 15 hours to obtain a liquid. Water (100 parts) was added dropwise to the resulting liquid, which was then filtered to obtain a filtrate. Some of water and 2-butanone was distilled away from the resulting filtrate using an evaporator to obtain a coloring dispersion liquid having a pigment content of 12.4%. The pigment content in the coloring dispersion liquid was determined in terms of a content of only the pigment from the total solid matter in the liquid by a dry weight method using MS-70 manufactured by A&D Co., Ltd.

Preparation Example 3: Preparation of Resin B

According to reproduction of Preparation Example 4 in WO2015/147192, a resin emulsion was prepared having an acid value of 6 KOH mg/g, a glass transition temperature of 0° C., and a solid content of 25%. This resin emulsion is referred to as a "resin B".

Preparation Example 4: Preparation of Coloring Ink

The components shown in Table 2 below were mixed accordingly to obtain a liquid having a total amount of 100 parts. Then the resulting liquid was filtered through a membrane filter with a pore size of 3 μm to obtain a coloring ink for use in evaluation of the cleaning solutions.

Abbreviations and the like used in Table 2 below have the following meanings. The numerical values in Table 2 below are expressed in terms of "parts". Note that the numbers of parts of the resin B and AQ515 in Table 2 are expressed as values converted into solid contents.

Dpi: Coloring dispersion liquid obtained from Preparation Example 2

TEG: triethylene glycol 1,2 HD: 1,2-hexanediol

SN465: a nonionic surfactant available from Nissin Chemical Industry Co., Ltd., Surfynol 465

AQ515: a polyethylene wax available from BYK Japan K.K.,

AQUACER 515 (solid content: 35.0%)

TABLE 2

| Component | Preparation Example 4 |
|---|---|
| Dp1 | 32.3 |
| TEC | 25 |
| 1,2HD | 10 |
| SN465 | 0.5 |
| Resin B | 2 |
| AQ515 | 1.4 |
| Water | Balance |
| Total | 100 |

[Stability Tests]

The cleaning solutions from Examples 1 to 3 and Comparative Examples 1 to 5 were each allowed to stand at room temperature for 12 hours, and then the conditions of the cleaning solutions were visually observed to evaluate their stabilities. The following two evaluation criteria were used. Evaluation results are shown in Table 3 below.

—Evaluation Criteria—

A: No change was observed in the conditions of a cleaning solution.

C: A liquid component was observed which was separated from a cleaning solution and floated on the surface of the cleaning solution.

Note that, in the stability test, only the cleaning solutions of "A" evaluation were used in the cleaning performance tests described later.

[Tests for Cleaning Performance]

The coloring ink obtained from Preparation Example 4 was added dropwise in an amount of 20 μL on a glass petri dish, and allowed to stand and be dried in a 60° C. incubator for 1 hour to obtain solid matter resulting from solidification of the coloring ink. To the resulting solid matter, added dropwise was 10 mL of each of the cleaning solutions from Examples 1 to 3 and Comparative Examples 2 to 4. Whether the solid matter was dissolved or not was then observed visually. The following 4 evaluation criteria were used. Evaluation results are shown in Table 3 below. In Table 3, symbol "-" means that the tests for cleaning performance were not conducted.

—Evaluation Criteria—

A: No residual solid matter was observed, and a homogeneous liquid was obtained.

B: A substantially homogeneous liquid was obtained but residual solid matter was slightly observed.

C: Residual solid matter was clearly observed, and a homogeneous liquid was not obtained.

D: No or almost no change in the shape of solid matter was observed.

Note that the fact that solid matter remains even in a small amount means that there is a possibility that clogging of an ink-jet head or the like cannot be eliminated. Therefore, a cleaning solution evaluated as other than "A" in cleaning performance is not practical.

TABLE 3

| | Example | | | Comparative Example | | | | |
|---|---|---|---|---|---|---|---|---|
| Evaluation result | 1 | 2 | 3 | 1 | 2 | 3 | 4 | 5 |
| Stability | A | A | A | C | A | A | A | C |
| Cleaning performance | A | A | A | — | D | B | C | — |

The results described above clearly demonstrate that the cleaning solutions of Examples 1 to 3 have superior stability and cleaning performance.

The invention claimed is:

1. A cleaning solution comprising:

a compound represented by the following formula (1):

$$R^1—O(EO)_m(PO)_nH \quad (1)$$

wherein $R^1$ represents a linear or branched C10 to C18 alkyl group, EO represents an ethyleneoxy group and PO represents a propyleneoxy group, an order in which EO and PO are bonded to each other is any order, m and n each independently represents an integer of 1 to 5, and a ratio of m and n, m:n, is 1:2 or more and less than 3:2, a compound represented by the following formula (2):

$$R^2—O(EO)_LH \quad (2)$$

wherein $R^2$ represents a linear or branched C1 to C30 alkyl group or an aryl group, EO represents an ethyleneoxy group, and L represents an integer of 10 or more, and water.

2. The cleaning solution according to claim 1, wherein a content of the compound represented by the formula (2) is 0.2% by mass to 2% by mass.

3. The cleaning solution according to claim 1, further comprising an organic solvent.

4. The cleaning solution according to claim 3, wherein the organic solvent is a glycol ether.

5. A method of cleaning an ink-jet printer comprising using the cleaning solution according to claim 1.

6. A method of cleaning an ink-jet printer, the method comprising:

contacting solid matter of ink-jet ink adhering to the ink-jet printer with the cleaning solution according to claim 1, thereby dissolving and removing the solid matter.

7. The method of cleaning according to claim 6, the method comprising:

filling an ink-jet head with the cleaning solution, and passing the cleaning solution through an ink flow path, thereby dissolving and removing the solid matter adhering to the ink flow path.

8. The method of cleaning according to claim 6, the method comprising:

immersing a nozzle of the ink-jet head in the cleaning solution, thereby dissolving and removing the solid matter adhering to the nozzle.

* * * * *